United States Patent
Weiland, Jr.

[15] 3,685,493
[45] Aug. 22, 1972

[54] SELF CLEANING DAIRY STALL DEVICE

[72] Inventor: Gregory L. Weiland, Jr., R.R. #1, Thief River Falls, Minn. 56701

[22] Filed: May 15, 1970

[21] Appl. No.: 37,769

[52] U.S. Cl.................................................119/28
[51] Int. Cl................................................A01k 01/00
[58] Field of Search.................119/22, 28, 27, 15, 16

[56] References Cited

UNITED STATES PATENTS

| | | | |
|---|---|---|---|
| 1,711,004 | 4/1929 | Youngman | 119/15 |
| 2,601,844 | 7/1952 | Lovell | 119/22 |
| 529,569 | 11/1894 | Thayer et al. | 119/28 |
| 3,119,373 | 1/1964 | Schmid | 119/28 |

Primary Examiner—Hugh R. Chamblee
Attorney—Robert E. Kleve

[57] ABSTRACT

The invention comprises a self cleaning dual stall dairy device having two rows of stalls and a walkway therebetween, with the stalls and walkway being suspended upon stilts or posts. A plastic pan is mounted below the stalls and walkway, and an auger is mounted to the bottom of the pan. Opposed spray pipes are mounted to the upper outer edges of the pan for spraying water into the pan, so that when animal deposits drop through the stalls into the pan they will be washed or moved by the spray from the spray pipes down to the auger and the auger will rotate to auger the deposits out of the pan.

2 Claims, 10 Drawing Figures

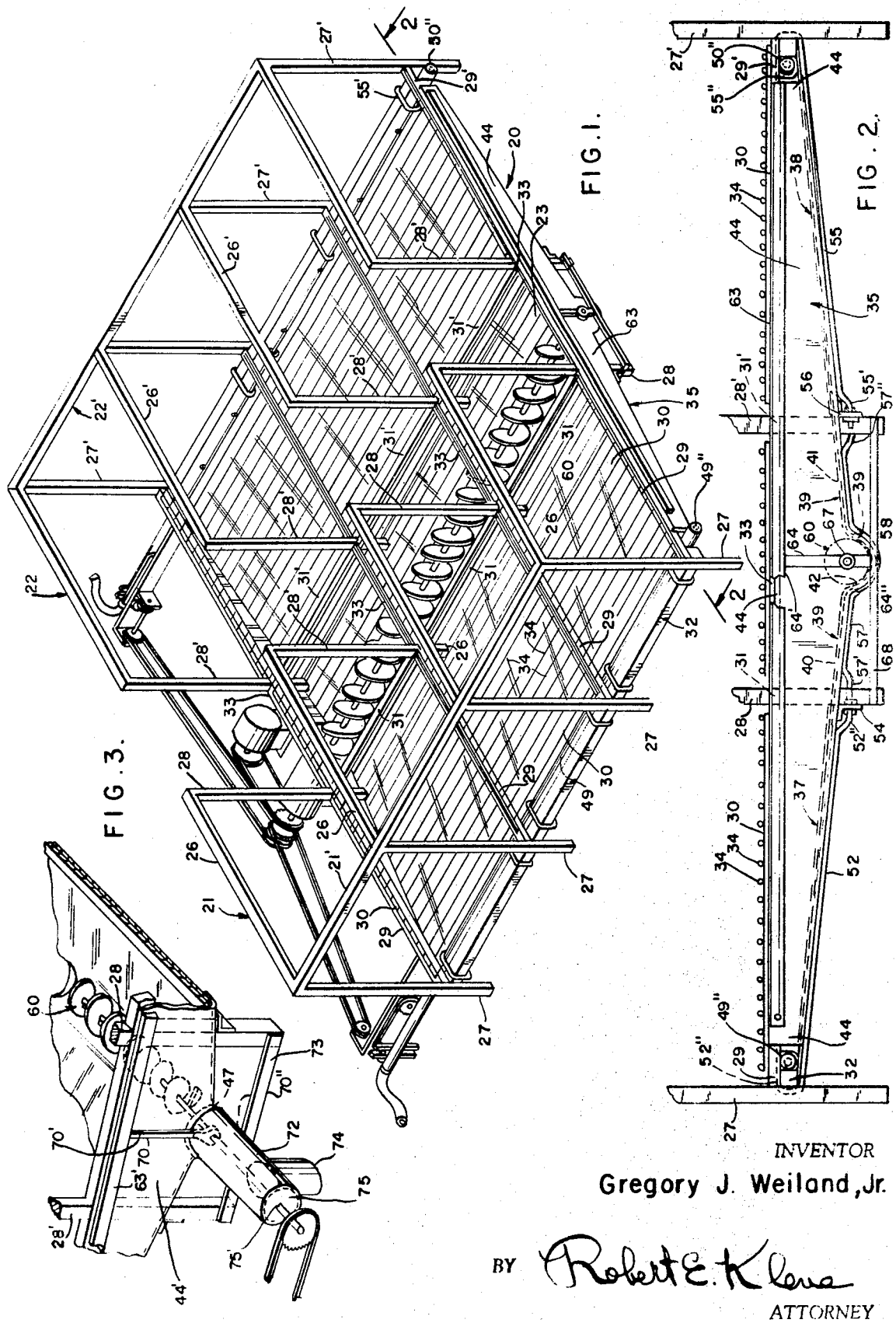

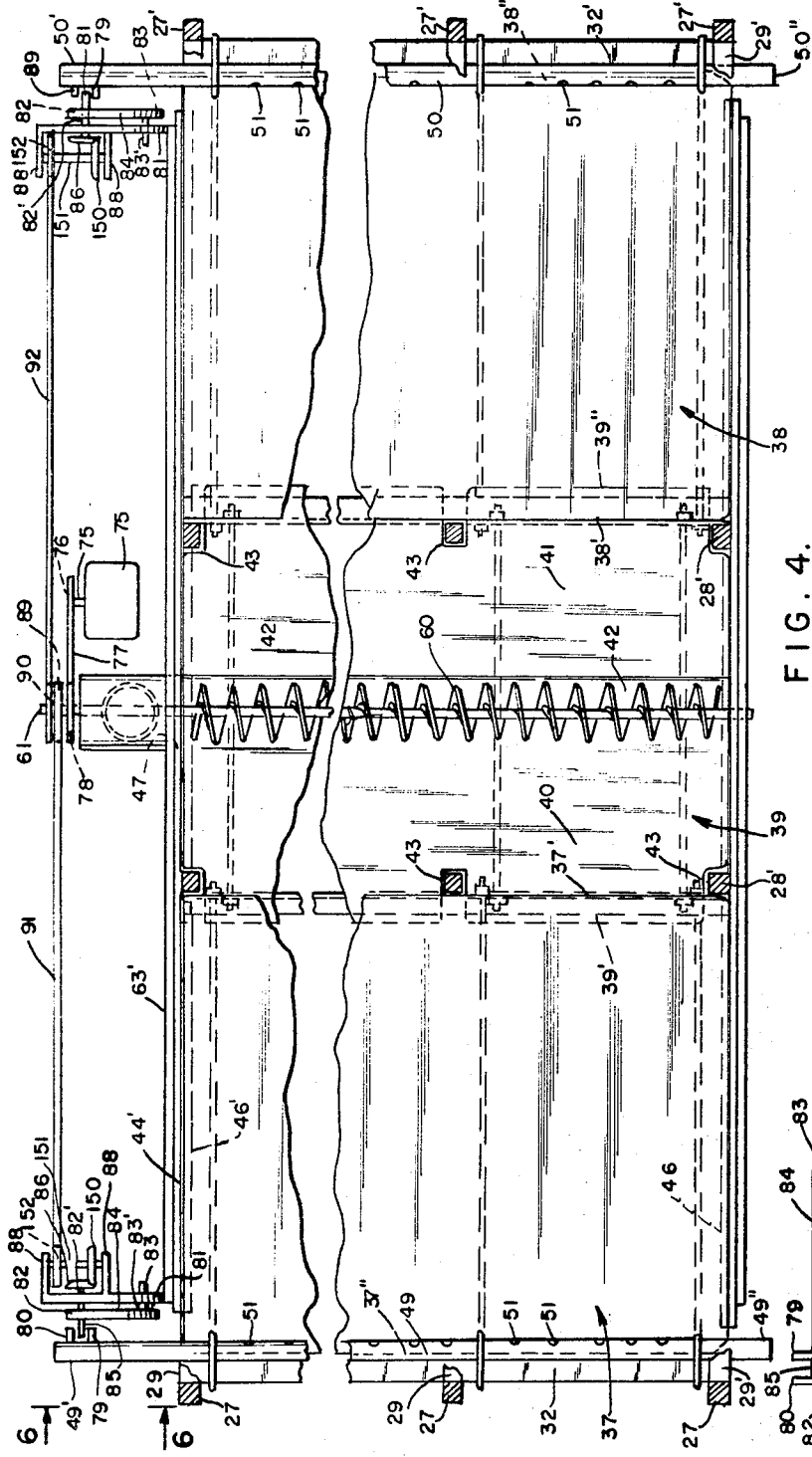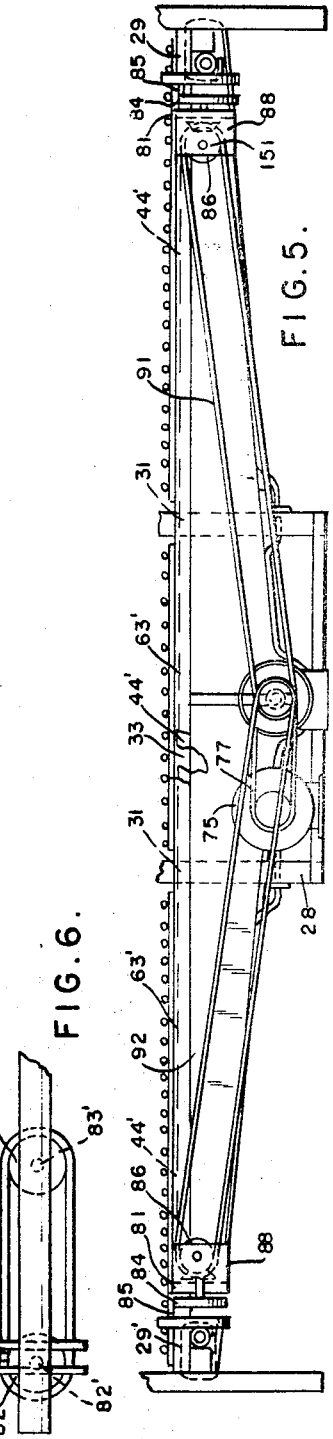

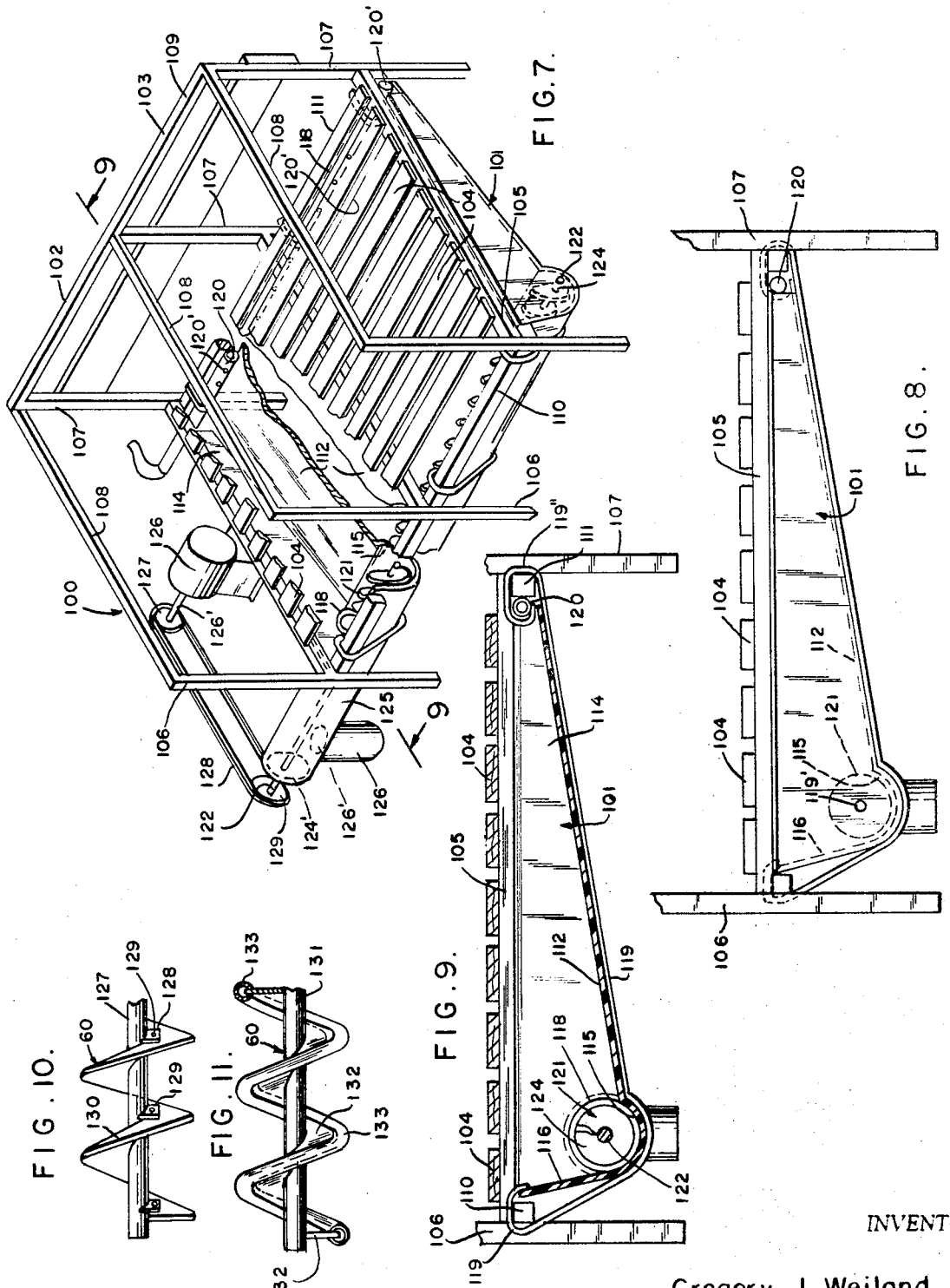

3,685,493

SELF CLEANING DAIRY STALL DEVICE

This invention relates to stalls, more particularly the invention relates to animal stalls for cattle and the like.

It is an object of the invention to provide a novel diary stall device having automatic stall cleaning structure beneath the stalls.

It is a further object of the invention to provide a novel stall device for cattle having an inclined pan structure below the stalls, with an auger along the lower portion of the inclined pan structure for augering animal deposits out of the pan.

It is another object of the invention to provide a novel stall device having a plastic pan beneath the stalls and an auger for augering animal deposits out of the pan with a water spray pipe structure for spraying water onto the pan for cleaning the pan and assisting in the augering away of the deposits.

Further objects and advantages of the invention will become apparent as the description proceeds and when taken in conjunction with the accompanying drawings wherein:

FIG. 1 is a perspective view of the self cleaning dairy stall device illustrating the preferred form of the invention employing the dual stall structure.

FIG. 2 is a fragmentary front elevational view of the self cleaning dairy stall device taken along line 2—2 of FIG. 1.

FIG. 3 is a fragmentary perspective view of the central rearward portion of the dual stall self cleaning dairy stall.

FIG. 4 is a fragmentary top view of the dual stall device, with the horizontal framework of the stalls, and portions of the vertical framework of the stalls broken away to reveal the interior construction.

FIG. 5 is a fragmentary rear elevational view of the dual stall device.

FIG. 6 is a cross-sectional view taken along line 6—6 of FIG. 4.

FIG. 7 is a fragmentary perspective view of a modified form of stall device, employing only a single row of stalls.

FIG. 8 is a fragmentary side elevational view of the modified form of the dairy stall invention.

FIG. 9 is a cross-sectional view taken along line 9—9 of FIG. 7.

Briefly stated, the invention comprises a self cleaning dairy stall device having a plurality of stalls arranged in a dual row with a walkway therebetween a plastic pan mounted beneath the stalls and walkway. The plastic pan has a pair of downwardly inclined bottom surfaces inclining downward toward one another with an auger extending across the pan along the lower portions of the inclined surfaces, water spray pipes extend across the pan along the upper edges of the inclined surfaces. The auger acts to auger away animal deposits deposited by cattle in the stalls and dropping through the stalls into the pan, with the water spray pipe spraying water into the pan to clean the pan and assist in the augering away of the deposits.

Referring more particularly to the drawings, the preferred form of the self cleaning cattle stall invention is illustrated in FIGS. 1-6, inclusive, and generally designated by the numeral 20 having two rows 21 and 22 of dairy stalls arranged in parallelian with one another with a walkway 23 therebetween.

The rows 21 and 22 are each illustrated with four individual stalls 21' in row 21 and four individual stalls 22' in row 22. However, the number of stalls employed may vary.

The stalls 21' in row 21 each have a skeleton framework which comprises side rails 26 with vertical posts 27 along the outside of the stalls and vertical posts 28 along the inside of the stalls.

Grating support rails 29 extend between the posts 27 and 28 and act to support rectangular gratings 30. Grating support rails 30 extend horizontally along the posts 27 and beneath the rails 29, with the posts 27, 28, and rails 26, 29, and 32, and beam 32 being mounted to one another in fixed relation by suitable means such a welding to form a fixed framework.

Similarly, the dairy stalls 22' of row 22 are formed of posts 27' and 28', rails 26', 29', and 31' and beams 32', which are arranged in opposed relation to the post, rails and beams of the stalls in the first row and which are also fixed to one another by welding to form a fixed framework for the stalls 22'.

The walkway between the rows 21 and 22 is formed by a plurality of horizontally extending grating support rails 33, which rails are connected between the posts 28 of stalls 21' and posts 28' of stalls 22' in fixed relation by welding to fixed stalls and walkway together. The support rails 33 also act to support additional gratings 30 which serve as a walkway for the cattle to walk upon to form the stalls.

The gratings 30 in the stalls 21' and 22' also provide a surface for the cattle to stand upon while in the stalls. There are openings between the rods 34 of the grating which allow animal deposits from the cattle to drop therethrough into a pan 35 mounted beneath the stalls and walkway.

Beneath the stalls 21' and 22' and the walkway 23, is a plastic pan 35. The pan 35 is made of three plastic sheet members 37, 38, and 39 which form the bottom of the pan, and a pair of generally triangularly shaped side panels 44 and 44' which form the sides of the pan.

The sheet members 37 and 38 for opposing relatively straight inclined surfaces beneath the stalls 21' and 22' and their inner edges 37' and 38' over lapp the outer edges 39' and 39'' of the central plastic sheet member 39.

The plastic sheet member 39 is positioned beneath the walkway 23 and has inclined outer surfaces 40 and 41, which are inclined in the same general angle as their corresponding over lapping sheet members 37, to form two continuous, opposed inclined surfaces. At the center of the sheet member 39 is a cylindrical recess 42, which forms the lowest point in the sheet members 37, 38, and 39 forming the bottom of the pan.

The central plastic sheet member 39 has also notches 43 along its outer edge to enable the sheet member 39 to straddle the vertical posts 28 and 28'.

The side panels 44 and 44' of the pan have folded under edges 46 and 46', which extend under the sheet member 37, 38, and 39 and are seated together in watertight relation. The side panels 44 and 44' also have a folded under edge portion 46'' which folds under the sheet member 39 at the cylindrical recess and is sealed together. The one side panel 44 has a cylindrical hole or opening 47, which is aligned co-axially with the cylindrical recess of the central sheet member 39.

The sheet member 37 and 38 are sealed together and where they overlapp and they are sealed are the posts 28 and 28', so that the three sheet members 37, 38, and 39 and 44 and 44' form a water tight pan except for the opening 47.

A pair of spray pipes 49 and 50 extend across the upper edges 37'' and 38'' of the sheet members 37 and 38 of the pan. The pipes 49 and 50 have a plurality or spray openings or holes 51 along their inner vertical edges, which direct the water inwardly and downwardly toward the central recess 42.

The pan 35 is supported beneath the stalls and walkways by support rods 52 and 55 and 57. The pan support rods 52 are identical to one another having their one ends 52' hooked and their outer ends 52'' threaded, with the hooked ends hooked around the beam 32 and spray pipe 49 and their threaded end 52'' passing through a bore in the angle iron 54 and with nut threaded onto the outermost end of the rod 52'' to tighten the rods to the angle iron and beam and spray pipe in fixed relation.

Similarly, pan support rods 55 have their outer ends 55' hooked and their inner ends 55'' threaded, with the hooked ends hooked around the beam 32' and the spray pipe 50, and their inner ends passing through a bore in angle iron 56, with a nut threaded onto the end from the other side to tighten the rod to the angle irons and beam and spray pipe in fixed relation.

The center support rods 57 have their outer ends 57' and 57'' threaded and they pass through bores in angle irons 54 and 56 respectively and nuts are threaded onto their outer most ends to tighten the rods 57 to the angle irons 54 and 56 in fixed relation. The rods 57 also have a central bend 58 to support the cylindrical recessed portion of the sheet member 39.

The angle irons 54 and 56 are fixed to the posts 28 and 28', respectively, by welding or other suitable means.

An auger 60 is rotatably mounted in the cylindrical recess of the central sheet member 39. The auger 60 has a sheet center shaft 61 which has a plastic spiral blade 62 mounted thereon.

A pair of strap irons 63 and 63' extend along the upper outer surfaces of the side panels 44 and 44' of the pan 35, and are bolted to the support rails 28, 28', 27, and 27' and act to support the side panels on the stalls.

A vertical center rod 64 has its upper end 64 welded to the strap iron 63 and its lower end welded to a cross beam 68, which cross beam is fixed to posts 28 and 28'. The center rod 64 has an eyelet 68 which rotatably receives and supports the outer end 61' of the shaft 61 of the auger.

A second vertical center rod 70 has its upper end welded to the strap iron 63' and passes through and is welded to a metal sleeve 72, with the lower end 70' of the rod welded to a cross beam 73 which beam is fixed to posts 28' and 28, respectively.

The metal sleeve 70 has its inner edges sealed around the hole 47 in the side panel of the plastic pan 35, in water tight relation to allow the material augered by the auger from the pan to pass or flow from the pan into the sleeve 70. The sleeve 70 has a laterally extending conduit or leg 74, which extends vertically downward from the sleeve 70 and is in communication with sleeve 70, so that materials received from the pan into sleeve 70, will travel downward into the conduit 74 and out of the conduit 74 to a suitable sewage pond or lagoon. The sleeve 74 may be made of any desired length so as to reach a lagoon or pond spaced a substantial distance away from the stalls.

The auger 60 is rotated by a motor 75, which motor is positioned adjacent the rear of the stalls. The motor 75 has toothed gear 76 fixed to the outer end of the motor shaft 75' and the gear 76 drives an endless link chain 77 which chain in turn drives a toothed gear 78 and the tooth gear 78 is fixed to the shaft 61 of the auger whereby the energizing of the motor 75 rotates the auger 60 counterclockwise when viewed from FIG. 7.

The spray pipes 49 and 50 have flexible conduits 150 and 151 connected to their outer ends 49' and 50', and the flexible conduits 150 and 151 are in turn connected to a source of water, such as a water faucet.

The spray pipes 49 and 50 will be turned on by the water faucets at the same tine as the motor 75 is energized so that water will be sprayed into the pan from the spray holes in the spray pipes at the same time the auger is rotating.

Thus any animal deposits dropping through the grating from either the walkway for the stalls, when assisted by the water spray will gravitate down to auger 60, which will auger the deposits along with the water out of the pan into the sleeve 70 and down conduit 74 into a sewage pond, which as previously indicated will be spaced a substantial distance from the stalls.

Thus the device will keep the stalls and walkway substantially free from animal deposits.

The water to the pipes 49 and 50 may be regulated by a conventional timer which will activate the water faucets so that the pipes 49 and 50 will spray the pan at regular intervals. The motor 75 may also be connected to the timer so that it will energize when the water faucet are opened to release water into the spray pipe.

Each spray pipe 49 and 50 is provided with a reciprocating mechanism to slide the pipes 49 and 50 back and forth along their longitudinal axis with the confines of hooks 52' and 55', with the hook being loosely surrounding the pipes to facilitate their movement. The reciprocating movement of the pipes will vary the position of the spray openings relative to the pan 35, for more effective cleaning of the pan 35.

The reciprocating mechanism is essentially the same for each pipe 49 and 50, except that they are placed in revised or opposed order to one another. The pipes 49 and 50 each have a pair of vertically extending rods 79 and 80, which are welded to the outer ends 49' and 50' of the pipes.

The metal strap 63' has a pair of mounting flanges 81 which extend rearwardly from opposite ends of the strap 63' and are fixed thereto. Each spray pipe 49 and 50 has a pair of gears 82 and 83 which have shaft 82' and 83' fixed to the gears, and the shafts are rotatably mounted in the mounting flange 81 for each spray pipe. An endless link chain 84 is mounted over the gears 82 and 83 of each pipe 49 and 50 and each endless link chain 84 has a pin 85 fixed thereto which engages between the rods 79 and 80, so that when the chain rotates or gears 82 and 83, it will move the rods 79 and 80 back and forth, and thereby move the spray pipes back and forth along their longitudinal axis, for adjusting or varying the position of the spray openings in the pipes relative to the pan 35.

Each spray pipe mechanism has a gear 86 fixed to shaft 82' and a gear 150 is fixed to shaft 150' and drives gear 86. Shaft 150 is fixed to a shaft 151 which shaft is rotatably mounted to the lateral legs 88 and of the flange 81, and a second gear 152 is also fixed to shaft 151.

The auger shaft 61 has a pair of gears 89 and 90 fixed to the shaft 61 and endless link chains 91 and 92 connect the gears 89 and 90 to gears 152 of each pipe mechanism.

Consequently, when the motor 75 is energized, it rotates the auger shaft 61, and the rotation of the auger shaft 61, also rotates gears 89 and 90, which rotate endless link chains 91 and 92, which in turn, in each reciprocating mechanism, rotate gear 152, and gear 152 rotates gear 150, which gear in turn rotates gear 86, which in turn rotates gear 82, thereby rotating endless link chains 84 and idler fears 83, which through the movement of the pan 85 on the endless link chain 84 reciprocates the spray pipes 49 and 50. Thus, the spray pipes will be reciprocating when the auger is rotating and when the water in the spray pipes is turned on.

MODIFIED FORM OF THE INVENTION

In the modified form of the invention, illustrated in FIGS. 7–9, inclusive, only a single row of stalls 100 is employed, although any desired number of stalls in the row may be employed, with the pan 101 and other associated structure having a length adjusted accordingly. Also no spray pipe reciprocating mechanism is illustrated in the modified form of the invention.

The stalls 102 and 103 in the single row 100 are also intended for use as cattle stalls with the plank 104 resting on top of horizontal support rails 105, for the cattle to stand on. The stalls also have vertical posts 106 and 107 and the support rails 105 fixedly connect the posts 106 and 107 together in spaced relation. Also, guard rails 108 fixedly connect the upper end of the posts 106 and 107 together and a lateral rail 109' fixedly connect posts 107 together. A pair of horizontal beams 100 and 111 extend under rails 105 and are fixed to posts 106 and 107, respectively.

The pan 101 is made of plastic with an inclined bottom portion 112 and a pair of upright side panels 113 and 114. The bottom panel 112 has an annular recessed portion 115, and an upturned wall portion 116, which extends upward from the recess. The panels 113 and 114 and the bottom panel 112, including the recessed portion 115 and wall portion 116, are all integrally connected together to form a water tight receptacle or pan except for an opening or cylindrical hole 118 in the panel 114.

The plastic pan 101 is mounted to the underside of the stalls by means of rods 119. The rods 119 have their one ends 119' hooked over the beam 110 and their other ends 119'' hooked beam 111 and around a spray pipe 120. The spray pipe 120 is mounted along the top of the plastic pan 101 and extends from along the stalls. The spray pipe 120 has a plurality of spray openings 120' directed toward auger 121. The auger 121 has a metal shaft 122 with a plastic spiral blade 123 fixed thereto. The shaft 122 has one end rotatably mounted in a bore 124 in side panel 113 and the other end rotatably mounted in a bore in the end cap 124' which end cap is fixed across the outer end of the sleeve 125. A motor 126 is positioned adjacent the shaft 122' and the drive shaft 126' of the motor has a gear 127 fixed to the outer end and the gear 127 drives an endless link chain 128 which in turn drives a gear 129 fixed to the shaft 122' of the auger, whereby the energizing of the motor 126 rotates the auger. The spray pipe 120 will be connected by a suitable conduit to a water faucet, and the water will be turned on at the same time the motor is turned on so that any animal deposits deposited by the cattle that will drop between the planks 104 will drop onto the pan where the water spray will cause them to break up into smaller particles and gravitate down to the auger which auger rotates counter-clockwise when viewed from FIGS. 7 and 8 and will thereby auger out the deposits and water out of the pan through the bore 118 into the sleeve 125 and out the lateral conduit 126, which is fixed to and in communication with the sleeve 125, into a sewage pond or lagoon. Similarly, conduit 126 may be of any desired length so that the sewage pond may be spaced a substantial distance from the stalls.

The sleeve 125 may be made of plastic and will be fixed to and formed integrally with the side panel 114 of the pan 101, and aligned coaxially with the hole 118.

The auger as to both forms of the invention may be made with a steel shaft and metal lugs 128, welded to the shaft 127 with screws 129 screwed into the lugs 127 and into the blade 130, which blade may be made of plastic, as illustrated in FIGS. 4 and 7 and more specifically in FIG. 10.

As a modification the shaft of either auger 60 or 121 may be made of steel and the blade made of steel as illustrated in FIG. 11, and designated by numerals 131 and 132. A resilient plastic sleeve or tube 133 may be mounted along the outer edge of the blade by having a slot 134 in the tube which extends along the length of the tube and having the outer edge of the blade extending into the tube through the slot 134.

By having the blade or the outer surfaces of the blade made of resilient plastic the auger will not cut into the plastic pan in either form of the invention.

The spray pipes 49 and 50 being hollow and connected to the water faucet at their ends 49' and 50', will have their other ends 49'' and 50'' closed capped or closed and similarly spray pipe 120 will also have its one end 120' capped or closed.

Thus, it will be seen that a novel self cleaning dairy stall invention has been provided which in the preferred form, illustrated in FIGS. 1–6, has a dual row of stalls with a walkway therebetween and with a plastic pan mounted below the stalls, and a walkway and an auger rotatably mounted in the bottom of the pan opposing spray pipes at the upper edges of the pan for spraying water into the pan to clean the pan and drive animal deposits into the auger where the auger by rotating will carry the deposits out of the pan to a sewage pond or lagoon.

It will be obvious that various changes and departures may be made to the invention without departing from the spirit thereof, accordingly, it is not intended that the invention be limited to that specifically described in the specification or as illustrated in the drawings but only as set forth in the appended claims.

What is claimed is:

1. A self cleaning cattle stall device comprising a plurality of stalls, said stalls comprising elevated platforms for cattle to stand on, pan means mounted below said platforms, said stalls being arranged in dual rows including a walkway between the rows, an auger mounted in the pan means for augering deposits out of the pan means, said auger in said pan means being beneath said walkway, said platforms being formed of spaced members providing openings for the passage of waste material to the pan means, said pan means being inclined downward toward the auger, said spray pipe means extending along the upper edges of the inclined pan along the outer edges of the dual rows of platforms, having generally spaced spray outlets directed toward the auger for cleaning the pan and power means to move said spray pipe means relative to said pan.

2. A self cleaning cattle stall device comprising a plurality of stalls, said stalls comprising elevated platforms for cattle to stand on, pan means mounted below said platforms, said stalls being arranged in dual rows including a walkway between the rows, an auger mounted in the pan means for augering deposits out of the pan means, said auger in said pan means being beneath said walkway, said platforms being formed of spaced members providing openings for the passage of waste material to the pan means, said pan means inclining downward toward the auger, said spray pipe means extending along the upper edges of the inclined pan along the outer edges of the dual rows of platforms, and having generally spaced spray outlets directed toward the auger for cleaning the pan, said spray pipe means having means to shift said spray outlets back and forth longitudinally along the auger.

* * * * *